(12) United States Patent
Kim et al.

(10) Patent No.: US 7,917,929 B2
(45) Date of Patent: Mar. 29, 2011

(54) REMOTE RESERVATION RECORDING CONTROL SYSTEM AND METHOD THEREOF

(75) Inventors: Kang Soo Kim, Chilgok-Gun (KR); Hye Cheun Jeong, Daegu (KR)

(73) Assignee: LG Electronics Inc. (KR)

( * ) Notice: Subject to any disclaimer, the term of this patent is extended or adjusted under 35 U.S.C. 154(b) by 1668 days.

(21) Appl. No.: 10/392,880

(22) Filed: Mar. 21, 2003

(65) Prior Publication Data

US 2004/0031051 A1 Feb. 12, 2004

(30) Foreign Application Priority Data

Aug. 8, 2002 (KR) ........................ 10-2002-0046825

(51) Int. Cl.
  *G06F 13/00* (2006.01)
(52) U.S. Cl. .......................................................... 725/58
(58) Field of Classification Search ........................ None
  See application file for complete search history.

(56) References Cited

U.S. PATENT DOCUMENTS

| | | | | | |
|---|---|---|---|---|---|
| 4,724,478 | A | * | 2/1988 | Masuko et al. | 725/119 |
| 5,815,297 | A | * | 9/1998 | Ciciora | 398/112 |
| 5,949,974 | A | * | 9/1999 | Ewing et al. | 709/202 |
| 6,374,406 | B2 | * | 4/2002 | Hirata | 725/132 |
| 6,772,433 | B1 | * | 8/2004 | LaJoie et al. | 725/52 |
| 2001/0041551 | A1 | * | 11/2001 | Rotzoll | 455/343 |
| 2002/0042778 | A1 | * | 4/2002 | Nel | 705/42 |
| 2002/0046407 | A1 | * | 4/2002 | Franco | 725/110 |
| 2002/0059629 | A1 | * | 5/2002 | Markel | 725/100 |
| 2002/0100052 | A1 | * | 7/2002 | Daniels | 725/87 |
| 2002/0145993 | A1 | * | 10/2002 | Chowdhury et al. | 370/338 |
| 2002/0152473 | A1 | * | 10/2002 | Unger | 725/120 |
| 2003/0005462 | A1 | * | 1/2003 | Broadus et al. | 725/110 |
| 2003/0046697 | A1 | * | 3/2003 | Shinohara | 725/51 |
| 2003/0235401 | A1 | * | 12/2003 | Milnes et al. | 386/83 |
| 2006/0031883 | A1 | * | 2/2006 | Ellis et al. | 725/58 |
| 2007/0214482 | A1 | * | 9/2007 | Nguyen | 725/91 |

FOREIGN PATENT DOCUMENTS

| | | |
|---|---|---|
| CN | 1346103 | 4/2002 |
| EP | 1158782 | 11/2001 |
| EP | 1211848 | 6/2002 |
| JP | 2001145140 | 5/2001 |
| JP | 2001339674 | 12/2001 |
| JP | 2002112155 | 4/2002 |
| JP | 2002118805 | 4/2002 |
| JP | 2002199316 | 7/2002 |
| WO | WO 01/65862 | 9/2001 |

\* cited by examiner

*Primary Examiner* — Brian T Pendleton
*Assistant Examiner* — Olugbenga Idowu
(74) *Attorney, Agent, or Firm* — Lowe Hauptman Ham & Berner LLP

(57) ABSTRACT

A reservation recording control system and a method thereof, in which a user records a reservation for a desired broadcast program in a personal video recorder from a remote location over a distributed computer network such as the Internet. To this end, the system includes: a web server for transmitting reservation recording information for reservation-recording a broadcast program selected by a user; a communication unit for receiving the reservation recording information; and a personal video recorder for downloading the reservation recording information received by the communication unit and for recording the broadcast program selected by the user on the basis of the downloaded reservation recording information at a reserved time.

11 Claims, 2 Drawing Sheets

REMOTE RESERVATION RECORDING CONTROL SYSTEM AND METHOD THEREOF

BACKGROUND OF THE INVENTION

1. Field of the Invention

The present invention relates to a personal video recorder and, more particularly, to a remote reservation recording control system which can record a reservation for a broadcast program in the personal video recorder and a method thereof.

2. Description of the Background Art

Generally, a personal video recorder (PVR) connected to a digital television can record programs broadcast from one or several different broadcasting stations to an inner hard disk for up to a maximum number of hours, such as 40, from which a viewer can then make viewing selections.

The PVR is a digital recorder for recording broadcast programs to the hard disk, and replaying, that is different from a video cassette recorder which stores an image signal to a magnetic tape. Instead, the PVR is a recorder having a predetermined amount of storage time for recording television broadcast programs according to such capacity through a hard disk drive mounted in the PVR set-top box or a television body.

The PVR is similar to the conventional VCR in that broadcast programs received from the broadcasting stations are stored and the stored broadcast programs are watched by a viewer. However, the PVR is different from the conventional VCR in that the broadcast programs are recorded in the hard disk and replayed by a file replaying method such as that of a computer, with a central processing unit (CPU) for replaying, an operating system, a memory chip for storing software, and a large capacity hard disk mounted therein. That is, the PVR is composed of software for storing and replaying broadcast programs for television, a modem, and a hard drive that converts the television broadcast programs into digital signals to be stored in the hard disk and replayed. The user can also record a reservation for a desired broadcast program while watching a catalog of available broadcasts.

However, the conventional PVR can record reservations for the broadcast programs only at the place where the PVR is installed, so that the user cannot perform the reservation recording process outside the limited area of that place and time spent there.

SUMMARY OF THE INVENTION

Therefore, an object of the present invention is to provide a remote reservation recording control system which can perform a reservation recording process for a desired broadcast program at any time and from any remote location through a distributed computer network such as the Internet, and a method thereof.

Another object of the present invention is to provide a remote reservation recording control system operable to receive television programming from broadcasting stations using a digital PVR.

To achieve these and other objects and advantages and in accordance with the purpose of the present invention, as embodied and broadly described herein, there is provided a remote reservation recording control system comprising a web server for transmitting reservation recording information for a broadcast program selected by a user; a communication unit for receiving the reservation recording information; and a PVR for downloading the reservation recording information received by the communication unit and for recording the broadcast program selected by the user on the basis of the downloaded reservation recording information at a reserved time.

The present invention is also directed to a remote reservation recording control method comprising the steps of displaying an electronic program guide (EPG) on a web site; generating reservation recording information for a selected broadcast program when the user selects a desired broadcast program from the EPG; receiving the reservation recording information through a distributed computer network; and recording the broadcast program selected by the user on the basis of the received reservation recording information at a reserved time.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Hereinafter, with reference to FIGS. 1 to 2, will be explained a reservation recording control system and a method thereof, in which a user records a reservation for a desired broadcast program in a PVR from a remote location at any place and at any time through a distributed computer network such as the Internet and is thereafter enabled to easily watch the recorded broadcast program at a desired time. As used herein, a "remote" location refers to any location from which the user places a broadcast program reservation via a distributed computer network, e.g. the Internet. While the present invention is directed to the placement of program reservations from a physical location separate and at a distance from the location of the PVR, i.e., from a house or other building physically detached from the physical structure within which the PVR resides, placement of program reservations from within the same physical structure within which the PVR resides are also considered to fall within the scope of the present invention provided such reservations are placed via the distributed computer network, e.g. the Internet.

Figure 1:
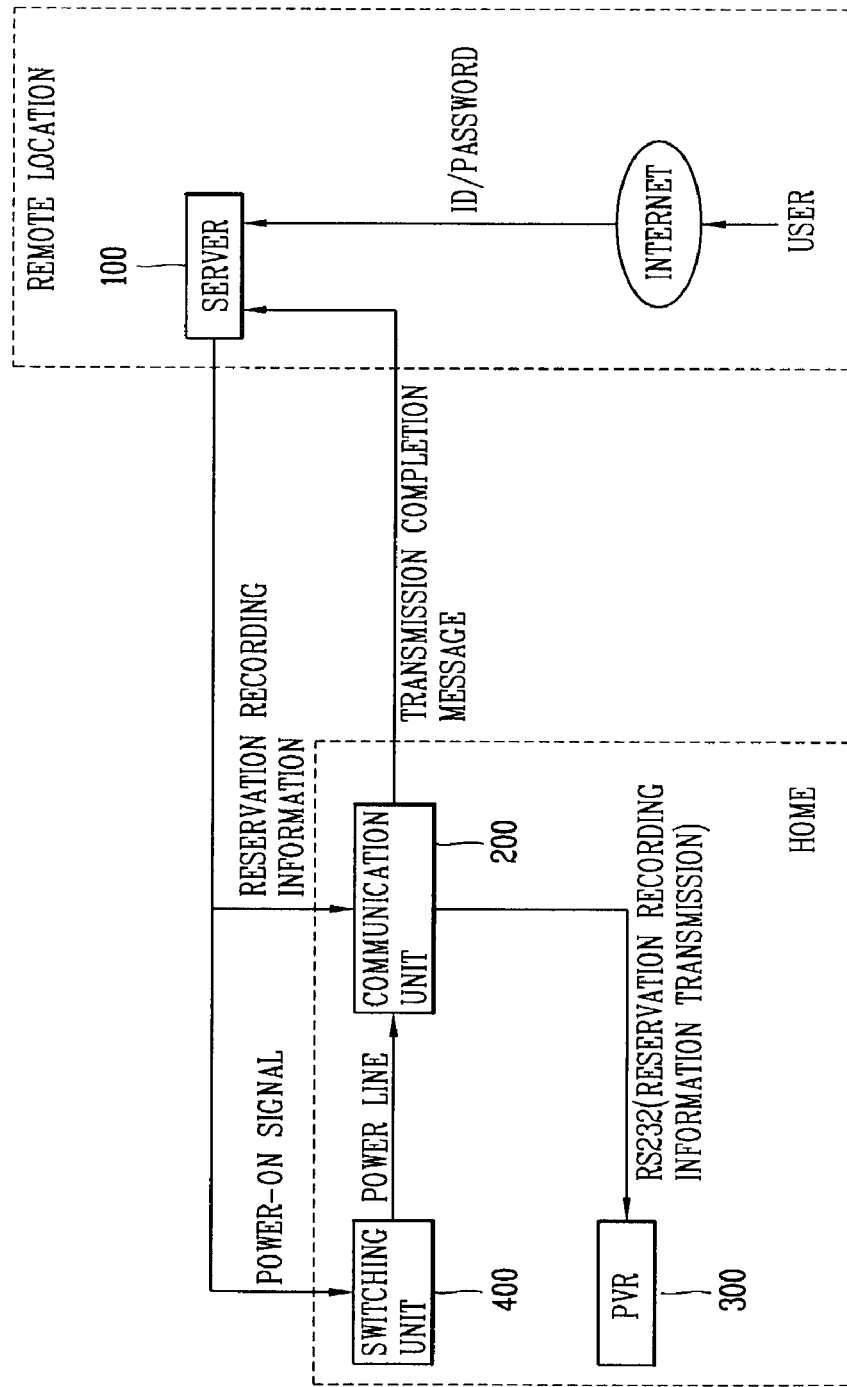
FIG. 1 is a block diagram showing the remote reservation recording control system according to one preferred embodiment of the present invention.
Figure 2:
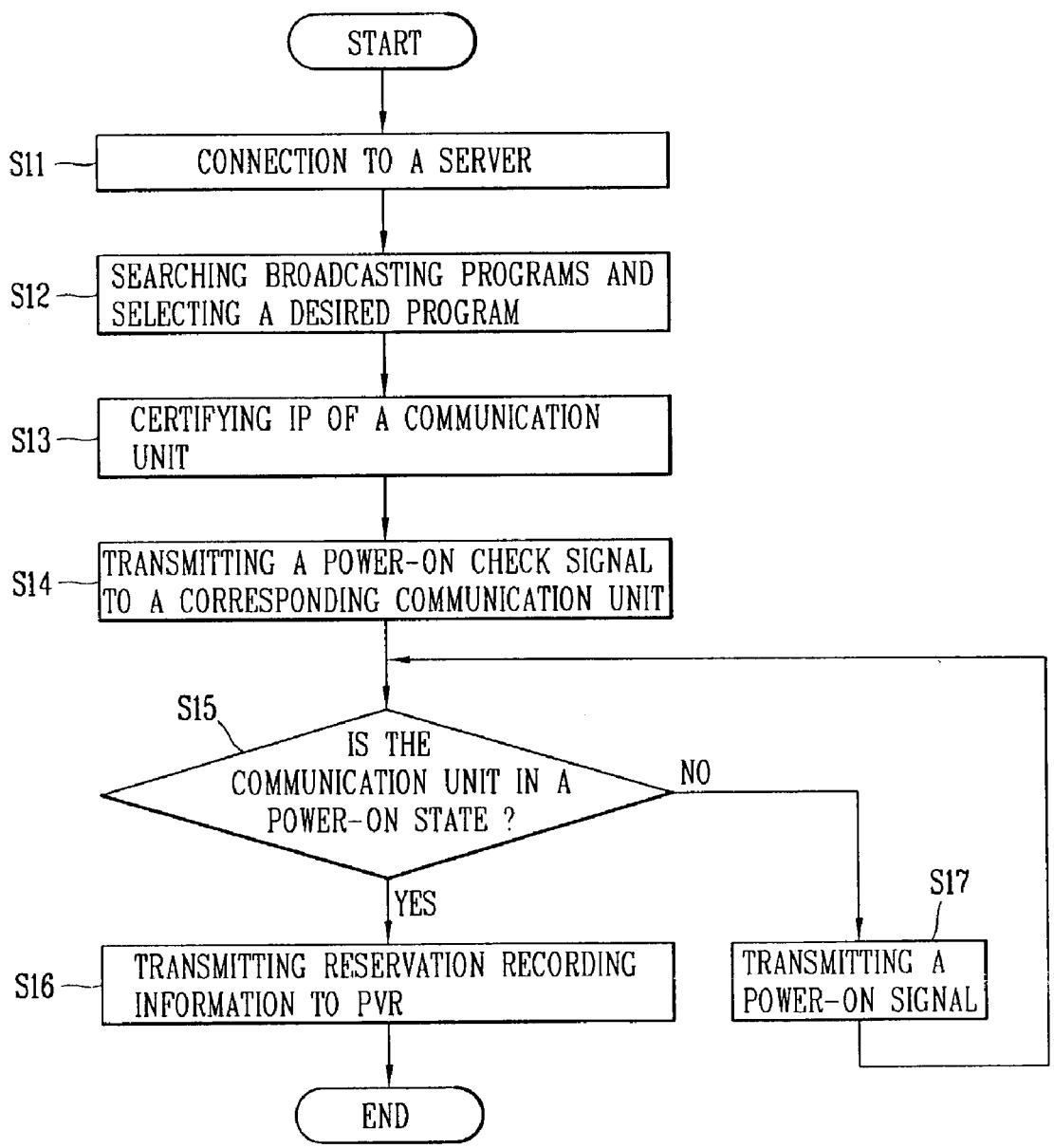
FIG. 2 is a flow chart showing the remote reservation recording control method according to one preferred embodiment of the present invention.

As shown in FIG. 1, the remote reservation recording control system includes a web server 100, a communication unit 200, a switching unit 400 and a PVR 300. The web server 100 performs a user certification process and then, when the user selects a remote reservation recording, generates reservation recording information in order to record a reservation for a power-on signal and a broadcast program selected by the user. The communication unit 200 receives the reservation recording information through the Internet, and the switching unit 400 switches the communication unit 200 to a power-on state on the basis of the power-on signal transmitted from the web server 100 when the communication unit 200 is in a power-off state. The PVR 300 downloads the reservation recording information from the web server 100 through the communication unit 200 and records the broadcast program selected by the user on the basis of the downloaded reservation recording information at a reserved time. Herein, "reservation recording information" means information for reservation-recording of a selected broadcast program at a reserved time as selected by the user from a remote location. That is, the PVR 300 records the broadcast program reserved by a viewer at a reserved time on the basis of the reservation recording information.

Hereinafter, operation of the remote reservation recording control system according to the preferred embodiment of the present invention will be explained with reference to FIG. 2 which is a flow chart showing the remote reservation recording control method according to one preferred embodiment of the present invention.

First of all, a user who is remotely located relative to the PVR accesses the web server 100 through the Internet in order to search for a broadcast program to be recorded in the PVR 300 so that the user can record a reservation for the recording of a desired television broadcast program in the PVR 300 installed in his or her home. The user connects to the web server 100 using a personal identification number and password previously registered with the web server 100, step 11.

The web server 100 displays the electronic program guide (EPG) on the web site so that the user can search for a desired broadcast program. When a broadcast program to be reserved is selected, step 12, the web server 100 transmits reservation recording information for recording the selected broadcast program to the communication unit 200. The web server 100 also provides information such as the network speed to the user through the web site.

The web server 100 preferably downloads the EPG from a plurality of broadcasting station servers (not shown) and displays the downloaded EPG on the web site or uses the server of the broadcasting stations as the web server 100.

The web server 100 certifies the digital television installed at the user's home (not shown) and an Internet Protocol (IP) of the communication unit 200 connected to the network on the basis of the user's ID and password, step 13. The web server then transmits a power-on check signal for certifying whether or not the communication unit 200 is in a power-on state, step 14. The web server 100 also determines an operational state of the communication unit 200 on the basis of the power-on check signal, step 15. Herein, when arbitrary sample data are transmitted to the communication unit 200 and are normally received by the communication unit 200, it is determined that the communication unit 200 is in a power-on state. In a preferred embodiment, the communication unit 200 is a modem mounted in the digital television (not shown) or a modem mounted in a personal computer PC (not shown).

If the communication unit 200 is determined to be in the power-on state, step 15, the communication unit 200 transmits the power-on check signal to the server 100, downloads the reservation recording information for recording the broadcast program selected by the user at the remote location from the web server 100, and transmits a download completion message to the web server 100. That is, when the communication unit 200 is in the power-on state, the web server 100 transmits the reservation recording information to the PVR 300 through the communication unit 200, step 16. In a preferred embodiment, the reservation recording information is temporarily stored in a storage unit (not shown) of the PC (not shown) connected to the web server 100 through the communication unit 200 and then transmitted to the PVR 300.

On the other hand, when the communication unit 200 is in a power-off state, that is, when the power-on check signal is not fed back to the web server 100, the web server 100 transmits the power-on signal to the switching unit 400 and continues to do so until the communication unit 200 becomes a power-on state, step 17. The switching unit 400 outputs the power-on signal to the communication unit 200 through a power line connected to the communication unit 200, thereby activating the communication unit 200.

At this time, the communication unit 200 informs the web server 100 of the power-on state by transmitting the power-on check signal received from the web server 100. The communication unit 200 then downloads the reservation recording information for recording the broadcast program selected by the user at the remote location from the web server 100, and transmits a download completion message to the web server 100 from which the user places a broadcast program reservation via a distributed computer network, e.g. the Internet. While the present invention is directed to the placement of program reservations from a physical location separate and at a distance from the location of the PVR, i.e., from a house or other building physically detached from the physical structure within which the PVR resides, placement of program reservations from within the same physical structure within which the PVR resides are also considered to fall within the scope of the present invention provided such reservations are placed via the distributed computer network, e.g. the Internet. Subsequently, the communication unit 200 transmits the downloaded reservation recording information to the PVR 300 through a serial communication port (for example, RS232).

The PVR 300 downloads the reservation recording information from the communication unit 200, and stores it in a preset address of an inner storage unit, such as a hard disk. Then, the PVR 300 records the broadcast program selected by the user at a prescheduled time on the basis of the reservation recording information.

In the meantime, the operational state of the communication unit 200 is determined by allocating the IP address to the communication unit 200 from a corresponding server, assigning a private domain to the allocated IP address, connecting to a service site of the assigned domain name, and determining whether or not a connection to the service site is possible. If connection to the service site is possible, the communication unit 200 is determined to be in a power-on state, while if connection is not possible, the communication unit 200 is determined to be in a power-off state.

On the other hand, the operational state of the communication unit 200 can also be determined by assigning a fixed IP address to the communication unit 200 and by evaluating whether a connection to the assigned fixed IP address is possible or not. If the web server 100 is connected to the fixed IP address assigned to the communication unit 200, the web server 100 determines that the communication unit 200 is in a power-on state.

As aforementioned, in the remote reservation recording control system and method thereof according to one preferred embodiment of the present invention, the user can record a reservation for a desired broadcast program in the PVR at a desired place and at a desired time from a remote location over the Internet, and thereby not be limited to setting up such recordings only while at home.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A reservation recording control apparatus, comprising:
a communication unit configured to receive (i) reservation recording information for reservation-recording a broadcasting program selected by a user from a server over only a distributed computer network and (ii) a power-on check signal;
a switching unit configured to switch the communication unit to a power-on state on the basis of the power-on check signal transmitted from the web server when the communication unit is in a power-off state; and
a personal video recorder configured to download the reservation recording information from the server by the communication unit and record the broadcasting program selected by the user on the basis of the downloaded reservation recording information at a reserved time;
wherein the server is adapted to transmit the power-on check signal, over only the distributed computer network, to the communication unit and, when the communication unit fails to acknowledge receipt of the power-on check signal, the server is adapted to continue to transmit a power-on signal, only via the distributed computer network, to the switching unit until the communication unit is switched to the power-on state;
the switching unit switches the communication unit to the power-on state by outputting the power-on signal to the communication unit through a power line connected between the communication unit and the switching unit; and
the communication unit, after being switched to the power-on state, informs the server of the power-on state by transmitting the power-on check signal back to the server and then downloads the reservation recording information from the server.

2. A remote reservation recording control system comprising:
a server configured to transmit (i) reservation recording information for reservation-recording a broadcasting program selected by a user via an internet and (ii) a power-on check signal;
a communication unit configured to receive the reservation recording information from the server over only a distributed computer network;
a switching unit configured to switch the communication unit to a power-on state on the basis of the power-on check signal transmitted from the server when the communication unit is in a power-off state; and
a personal video recorder configured to download the reservation recording information from the server by the communication unit and record the broadcasting program selected by the user on the basis of the downloaded reservation recording information at a reserved time;
wherein the server transmits the power-on check signal, over only the distributed computer network, to the communication unit and, when the communication unit fails to acknowledge receipt of the power-on check signal, the server continues to transmit a power-on signal, only via the distributed computer network, to the switching unit until the communication unit is switched to the power-on state;
the switching unit switches the communication unit to the power-on state by outputting the power-on signal to the communication unit through a power line connected between the communication unit and the switching unit; and
the communication unit, after being switched to the power-on state, informs the server of the power-on state by transmitting the power-on check signal back to the server and then downloads the reservation recording information from the server.

3. The system of claim 2, wherein, in response to user selection of the broadcast program, the server is adapted to perform a user certification process and then transmit the power-on check signal to the communication unit before sending the reservation recording information of the broadcast program to the communication unit.

4. The system of claim 2, wherein the network only over which the reservation recording information is transmitted from the server to the communication unit is the Internet.

5. The apparatus of claim 1, wherein the communication unit is a modem mounted in a personal computer located in the same residential premise as the personal video recorder.

6. The system of claim 2, wherein the server is adapted to transmit arbitrary sample data to the communication unit, to determine a current operational state of the communication unit by judging whether or not the sample data are normally received by the communication unit, and to send the power-on signal to the switching unit if the communication unit is not currently in the power-on state and does not acknowledge via the distributed computer network that the sample data has been received.

7. The apparatus of claim 1, wherein the communication unit is a modem mounted in a television located in the same residential premise as the personal video recorder.

8. The system of claim 2, wherein the server is adapted to display an electronic program guide (EPG) on a web site for allowing the user to select a desired broadcast program for recording from the EPG.

9. A remote reservation recording control system comprising:
a server configured to transmit reservation recording information for reservation-recording a broadcasting program selected by a user via an internet and a power-on check signal;
a communication unit configured to receive the reservation recording information from the server over only a distributed computer network;
a switching unit configured to switch the communication unit to a power-on state on the basis of the power-on check signal transmitted from the server when the communication unit is in a power-off state; and
a personal video recorder configured to download the reservation recording information from the server by the communication unit and record the broadcasting program selected by the user on the basis of the downloaded reservation recording information at a reserved time,
wherein the server transmits the power-on check signal, over only the distributed computer network, to the communication unit and, when the communication unit fails to acknowledge receipt of the power-on check signal, the server continues to transmit a power-on signal, only via the distributed computer network, to the switching unit until the communication unit is switched to the power-on state.

10. The system of claim 2, wherein the server is adapted to determine an operational state of the communication unit by assigning a fixed IP address to the communication unit and by evaluating whether a connection to the assigned fixed IP address is possible or not.

11. The system of claim 10, wherein the server is adapted to determine that the communication unit is in the power-on state when the server is connected to the fixed IP address assigned to the communication unit.

* * * * *